US009203958B1

(12) United States Patent
Nandula et al.

(10) Patent No.: US 9,203,958 B1
(45) Date of Patent: Dec. 1, 2015

(54) SYSTEM, METHOD, AND COMPUTER PROGRAM FOR COMMUNICATION CHANNEL-INDEPENDENT BUSINESS FLOW MANAGEMENT

(75) Inventors: Srikanth Nandula, San Jose, CA (US); Abhay V. Acharekar, Cupertino, CA (US); John D'amour, Sunnyvale, CA (US)

(73) Assignee: Amdocs Software Systems Limited, Dublin (IE)

( * ) Notice: Subject to any disclaimer, the term of this patent is extended or adjusted under 35 U.S.C. 154(b) by 445 days.

(21) Appl. No.: 13/208,283

(22) Filed: Aug. 11, 2011

(51) Int. Cl.
*G06F 15/16* (2006.01)
*H04M 3/42* (2006.01)

(52) U.S. Cl.
CPC .................................. *H04M 3/42068* (2013.01)

(58) Field of Classification Search
CPC ............... H04M 2203/405; H04M 2203/551; H04M 2203/6018; H04M 3/42068; H04M 3/5125
USPC .................. 340/2.8, 2.9; 370/431; 704/270.1; 709/227, 249
See application file for complete search history.

(56) References Cited

U.S. PATENT DOCUMENTS

| | | | | |
|---|---|---|---|---|
| 5,089,954 A | * | 2/1992 | Rago | 1/1 |
| 5,444,773 A | * | 8/1995 | Hirsohn et al. | 379/219 |
| 5,506,847 A | * | 4/1996 | Shobatake | 370/338 |
| 7,434,162 B2 | * | 10/2008 | Gorelov et al. | 715/255 |
| 7,881,439 B1 | | 2/2011 | Cohn et al. | |
| 8,032,409 B1 | * | 10/2011 | Mikurak | 705/14.39 |
| 2004/0064351 A1 | * | 4/2004 | Mikurak | 705/7 |
| 2006/0178918 A1 | * | 8/2006 | Mikurak | 705/7 |
| 2009/0125595 A1 | * | 5/2009 | Maes | 709/206 |
| 2010/0023395 A1 | * | 1/2010 | Bugenhagen | 705/14.45 |
| 2010/0075704 A1 | * | 3/2010 | McHenry et al. | 455/509 |
| 2010/0097952 A1 | * | 4/2010 | McHenry et al. | 370/252 |
| 2010/0105332 A1 | * | 4/2010 | McHenry et al. | 455/62 |
| 2010/0173586 A1 | * | 7/2010 | McHenry et al. | 455/62 |
| 2010/0239085 A1 | | 9/2010 | Sampson et al. | |
| 2011/0202755 A1 | * | 8/2011 | Orsini et al. | 713/151 |

OTHER PUBLICATIONS

Rosenberg et al., "SIP: Session Initiation Protocol", Jun. 2002, pp. 9-20, 147-159 and 166.*

* cited by examiner

*Primary Examiner* — Phuoc Nguyen
*Assistant Examiner* — Davoud Zand
(74) *Attorney, Agent, or Firm* — Zilka-Kotab, PC (57) ABSTRACT

A system, method, and computer program product are provided for communication channel-independent business flow management. In use, input associated with a communication is received over a communication channel. Additionally, a communication channel-independent business flow is initiated in response to the input. Furthermore, the input is provided to a communication channel-specific backend system, using the communication channel-independent business flow.

19 Claims, 5 Drawing Sheets

SYSTEM, METHOD, AND COMPUTER PROGRAM FOR COMMUNICATION CHANNEL-INDEPENDENT BUSINESS FLOW MANAGEMENT

FIELD OF THE INVENTION

The present invention relates to communication flows, and more particularly to business flows utilized for processing communication flows.

BACKGROUND

Traditionally, when a communication (e.g. network communication, etc.) is initiated, the communication is established using a communication flow. In the past, the communication flow has been processed using a business flow that is specific to a communication channel used by the communication flow. Unfortunately, this communication channel-specific technique for processing communication flows has exhibited various limitations.

For example, management of such communication channel-specific business processes has been required to maintain a plurality of such business processes for each communication channel, including at least one business process for each communication channel-specific backend system processing the communication flow. In this way, a separate business process has been utilized between each communication channel/communication channel-specific backend system, such that communications are incapable of being moved from one communication channel to another without at least a repetition of information being provided to process those cross-channel communications. There is thus a need for addressing these and/or other issues associated with the prior art.

SUMMARY

A system, method, and computer program product are provided for communication channel-independent business flow management. In use, input associated with a communication is received over a communication channel. Additionally, a communication channel-independent business flow is initiated in response to the input. Furthermore, the input is provided to a communication channel-specific backend system, using the communication channel-independent business flow.

DETAILED DESCRIPTION

Figure 1:
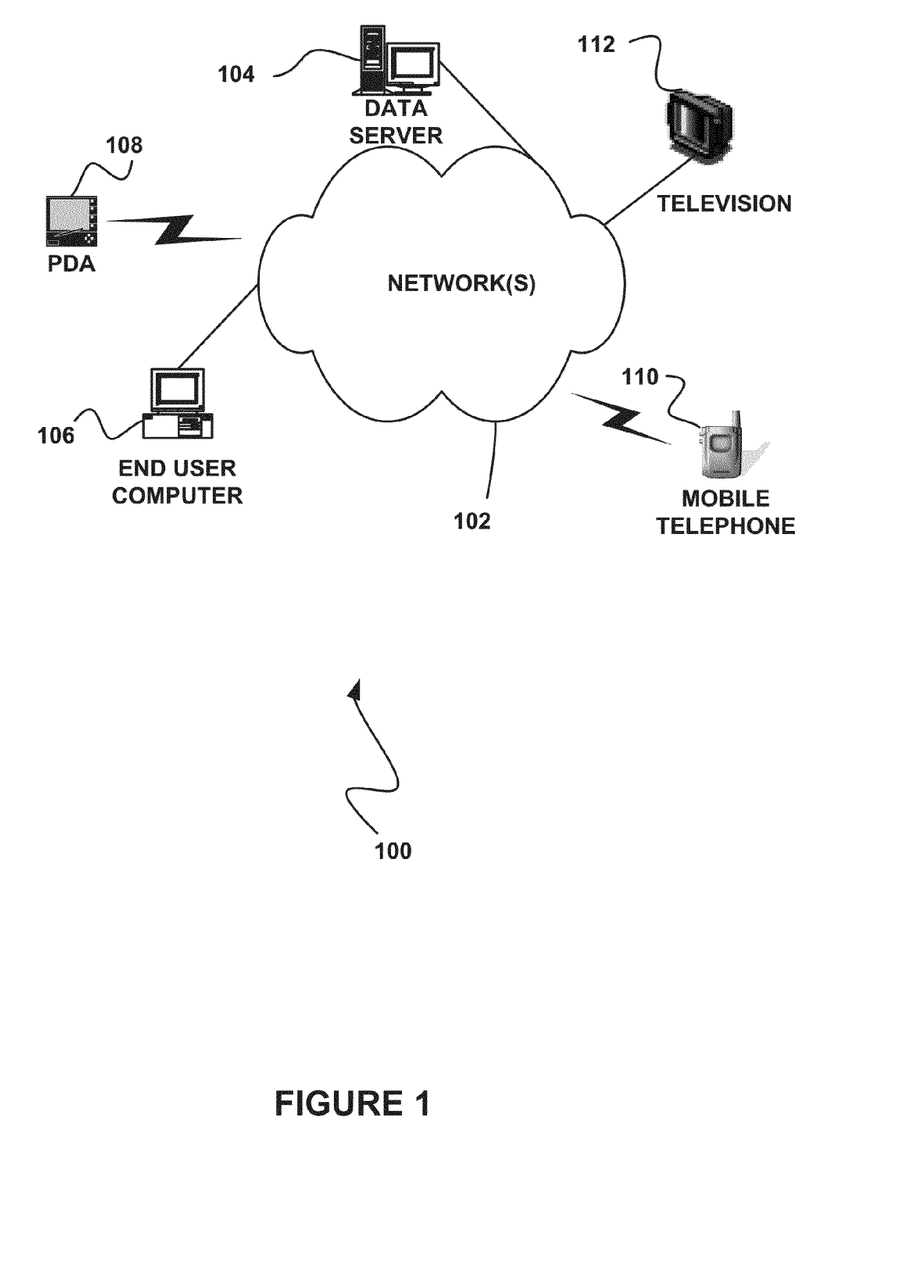
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
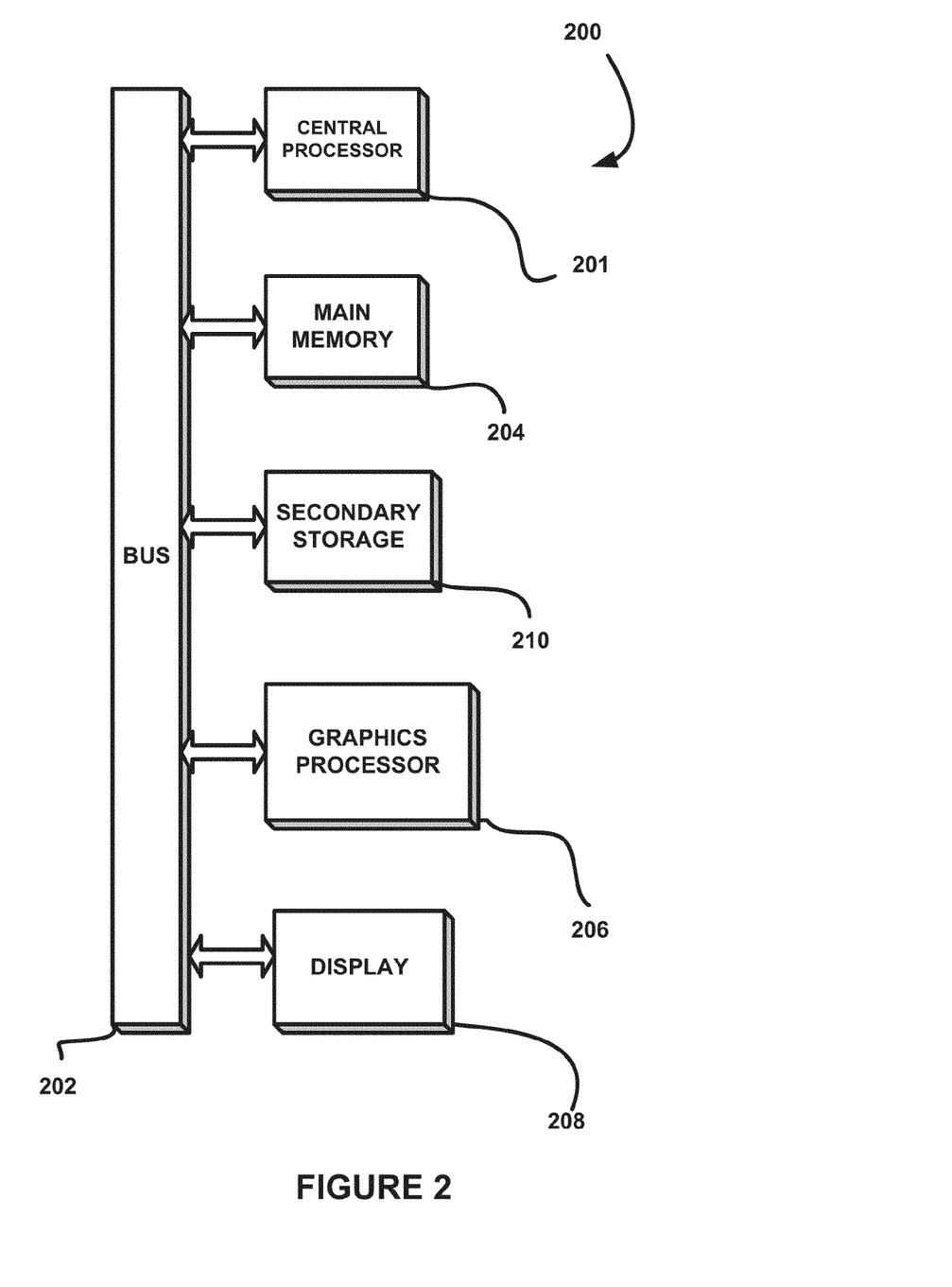
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
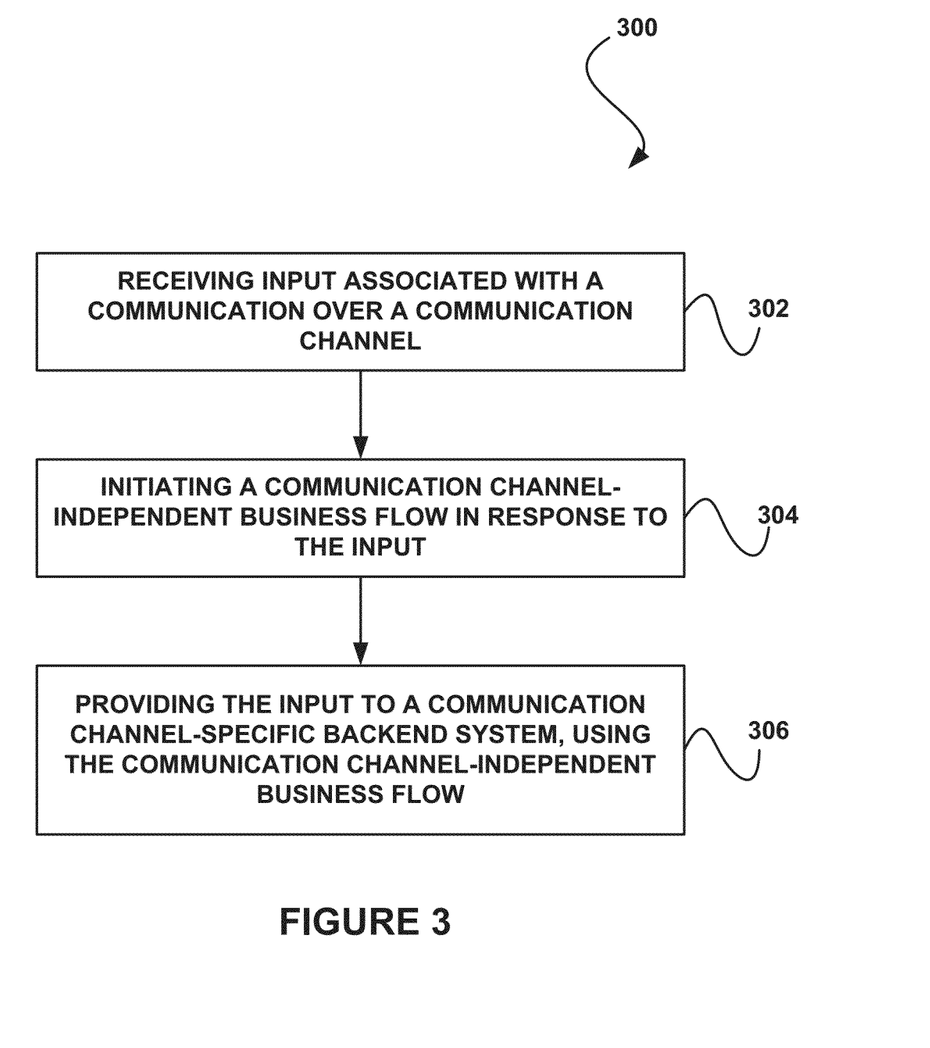
FIG. 3 illustrates a method for communication channel-independent business flow management, in accordance with an embodiment.

FIG. 3 illustrates a method 300 for communication channel-independent business flow management, in accordance with an embodiment. As an option, the method 300 may be carried out in the context of the details of FIGS. 1 and/or 2. Of course, however, the method 300 may be carried out in any desired environment. Further, the aforementioned definitions may equally apply to the description below.

As shown in operation 302, input associated with a communication is received over a communication channel. With respect to the present description, the communication includes any transfer of information from a source device to a destination device. Such communication may be effected via a communication flow. Accordingly, the communication channel may include any type of transmission medium for establishing the communication (e.g. from a first party to a second party).

For example, in one embodiment, the communication may include data sent from a first device (e.g. client device) to a second device (e.g. server device). With respect to such embodiment, the communication channel may include the particular type of transmission medium utilized for sending the data from the first device to the second device. The particular type of transmission medium may optionally include the particular service (e.g. physical network transmission line, wireless network transmission medium, etc. of a particular service provider, or application, etc.) utilized for sending the data from the first device to the second device.

In another embodiment, the communication may include data transmitted via an interactive voice response (IVR), an email, a telephone call, etc. Respectively, the communication channel may include an IVR channel, an email channel, a telephone channel, etc. To this end, the communication channel may correlate with a type (e.g. format, etc.) of the communication.

As noted above, input associated with the communication is received over the communication channel. The input may include any data associated with the communication which is received over the communication channel from the source of the communication (e.g. via the communication flow). For example, the input may include a request for the communication (i.e. that the communication be established, transmitted, etc.).

As an option, the source of the communication from which the input is received may include a device of a user. Thus, the input may be received in response to the user entering the input via the device. For example, the input may be received via a user interface (UI) presented to the user via the device.

Additionally, as shown in operation 304, a communication channel-independent business flow is initiated in response to the input. Such communication channel-independent business flow may include any process (e.g. thread, etc.) that is independent of the communication channel and that is capable of being utilized to provide the input to a backend system for processing purposes (as described in more detail below). For example, the communication channel may be independent of the communication channel by being agnostic of requirements, format, etc. associated with the communication channel utilized to receive the input.

By being independent of the communication channel, the business flow may be re-usable across multiple different communication channels, across multiple different channel-specific backend systems, etc. In one embodiment, the communication channel-independent business flow may be selected from a repository of communication channel-independent business flows for initiating the communication channel-independent business flow. Such repository may be provided by a business process manager interfacing the communication channel and associated backend systems, as an option. In this way, the communication channel-independent business flow may be initiated separately from the communication flow and further separately from the source of the communication flow.

Furthermore, as shown in operation 306, the input is provided to a communication channel-specific backend system, using the communication channel-independent business flow. In the present description, the communication channel-specific backend system includes any system separate from the source of the communication, and which is further specific to a communication channel. For example, the communication channel-specific backend system may be utilized for processing the communication (e.g. to establish the communication, effect the communication, etc.).

In various embodiments, the communication channel-specific backend system may include an IVR channel backend system, an email channel backend system, a telephone channel backend system, etc. To this end, the input may be provided to the communication channel-specific backend system for processing the input to provide the communication over the communication channel associated with the communication channel-specific backend system (and over which the input is received in operation 302).

As described above, a communication channel-independent business flow may provide a communication channel-independent interface between a particular communication channel utilized by a source device to provide input associated with a communication and an communication channel-specific backend system utilized for processing the input (e.g. to establish or otherwise effect the associated communication). This may therefore separate the business flow from the communication flow (e.g. such that the business flow is not necessarily embedded in scripts or other code utilized for capturing the input from the source device).

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
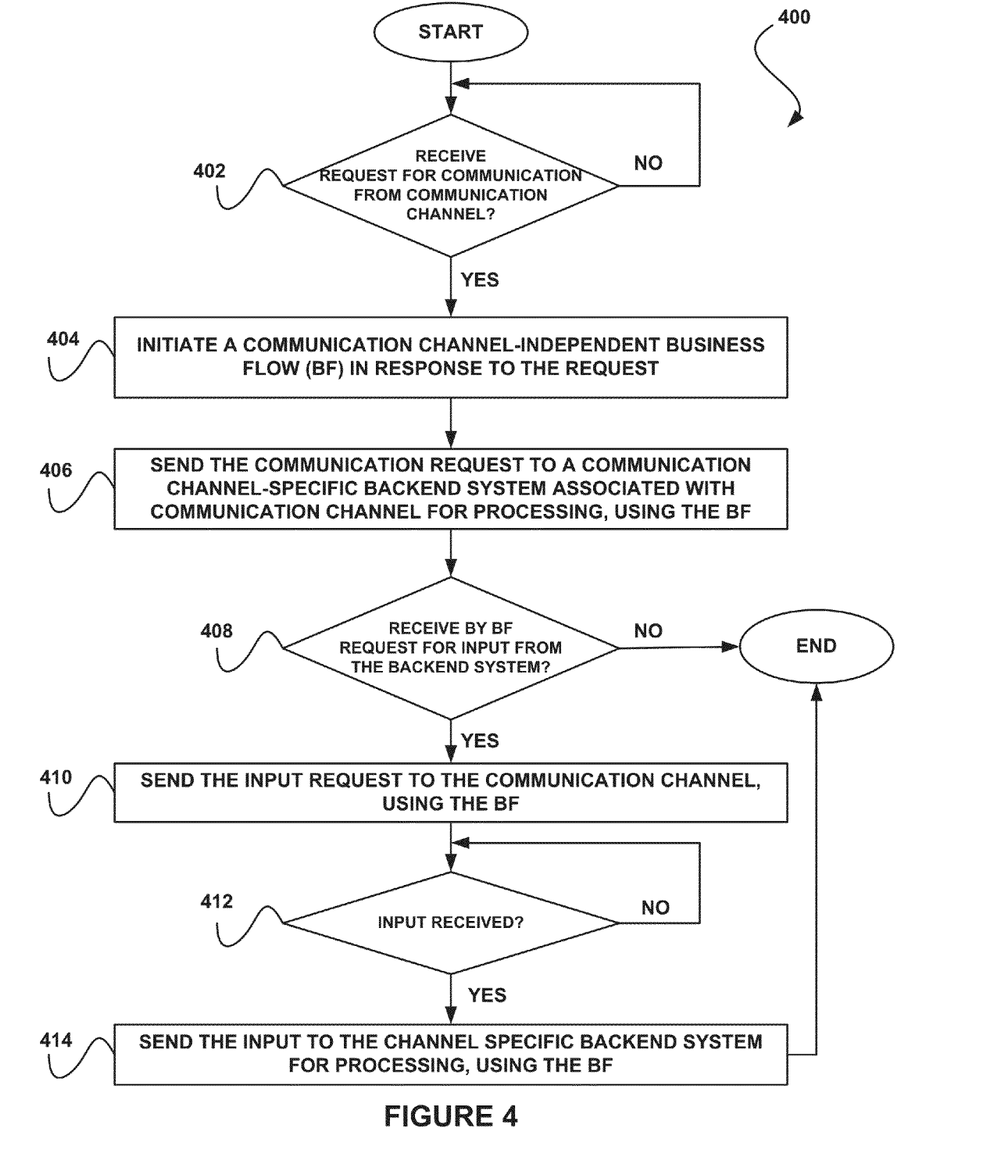
FIG. 4 illustrates a method for communicating between a communication channel and a communication channel-specific backend system using a communication channel-independent business flow, in accordance with another embodiment.

FIG. 4 illustrates a method 400 for communicating between a communication channel and a communication channel-specific backend system using a communication channel-independent business flow, in accordance with another embodiment. As an option, the method 400 may be carried out in the context of the details of FIGS. 1-3. Of course, however, the method 400 may be carried out in any desired environment. Again, the aforementioned definitions may equally apply to the description below.

As shown in decision 402, it is determined whether a request for a communication is received from a communication channel. Such request may be to establish the communication, in the present embodiment. Thus, the request may be from a client device utilized by a user to request communication with a remote destination device (e.g. server device, other client device, etc.).

If it is determined that a request for a communication is not received, the method 400 continues to wait for such a request. Once it is determined that a request for a communication is received, a communication channel-independent business flow is initiated in response to the communication request. Note operation 404. The communication channel-independent business flow may be any process that is independent of the particular communication channel via which the communication request is received. As an option, the communication channel-independent business flow may be selected from a plurality of communication channel-independent business flows for initiation thereof.

Additionally, as shown in operation 406, the communication request is sent to a communication channel-specific backend system associated with the communication channel for processing, utilizing the communication channel-independent business flow. For example, the communication channel-specific backend system may be specific to a communication channel for use in processing input associated with communications particular to the communication channel. Such communication channel-specific backend system may perform the processing for establishing or otherwise effecting the communications via the communication channel.

Thus, the communication channel-independent business flow may be initiated in response to receipt of the communication request via the communication channel for providing the communication request to the backend system specific to such communication channel. It is then determined whether a request for input is received by the communication channel-independent business flow from the communication channel-specific backend system (note decision 408).

The request for input may include any request for information made by the communication channel-specific backend system which for which is response is desired from the source of the communication request (e.g. the client device). For example, in one embodiment, the input requested may be information required by the communication channel-specific backend system for establishing or otherwise effecting the communication. Thus, the input may optionally be particular to the communication channel.

If it is determined that an input request is not received by the communication channel-independent business flow from the communication channel-specific backend system, the method 400 terminates. As another option (not shown), the method 400 may wait for receipt of such an input request and/or may wait for receipt of any additional input from the source of the communication. As a further option, the method 400 may only terminate (i.e. release) the communication channel-independent business flow upon an indication from the channel-specific backend system or source device of a completion of the communication.

In response to receipt of the input request by the communication channel-independent business flow from the communication channel-specific backend system, the input request is sent to the communication channel, using the communication channel-independent business flow. Note operation 410. The communication channel via which the communication request was initially received may be utilized by the communication channel-independent business flow to provide the input request to the source device which initiated the communication request.

Further, it is determined whether input is received from the source device, as shown in decision 412. Such input may include any response to the input request, in the present embodiment. Thus, the input may be provided by a user of the source device via a user interface of such source device.

If it is determined that input is not received, the method 400 continues to wait for receipt of the input. The method 400 may wait since the communication channel-specific backend system may require the input in order to process the communication. In response to receipt of the input, the input is sent to the communication channel-specific backend system, using the communication channel-independent business flow. Note operation 414. To this end, the communication channel-independent business flow may operate as an interface between the client device requesting the communication channel-specific communication and the communication channel-specific backend system, for providing the communication channel-specific backend system information from the client device necessary for the communication channel-specific backend system to establish/effect the communication.

Figure 5:
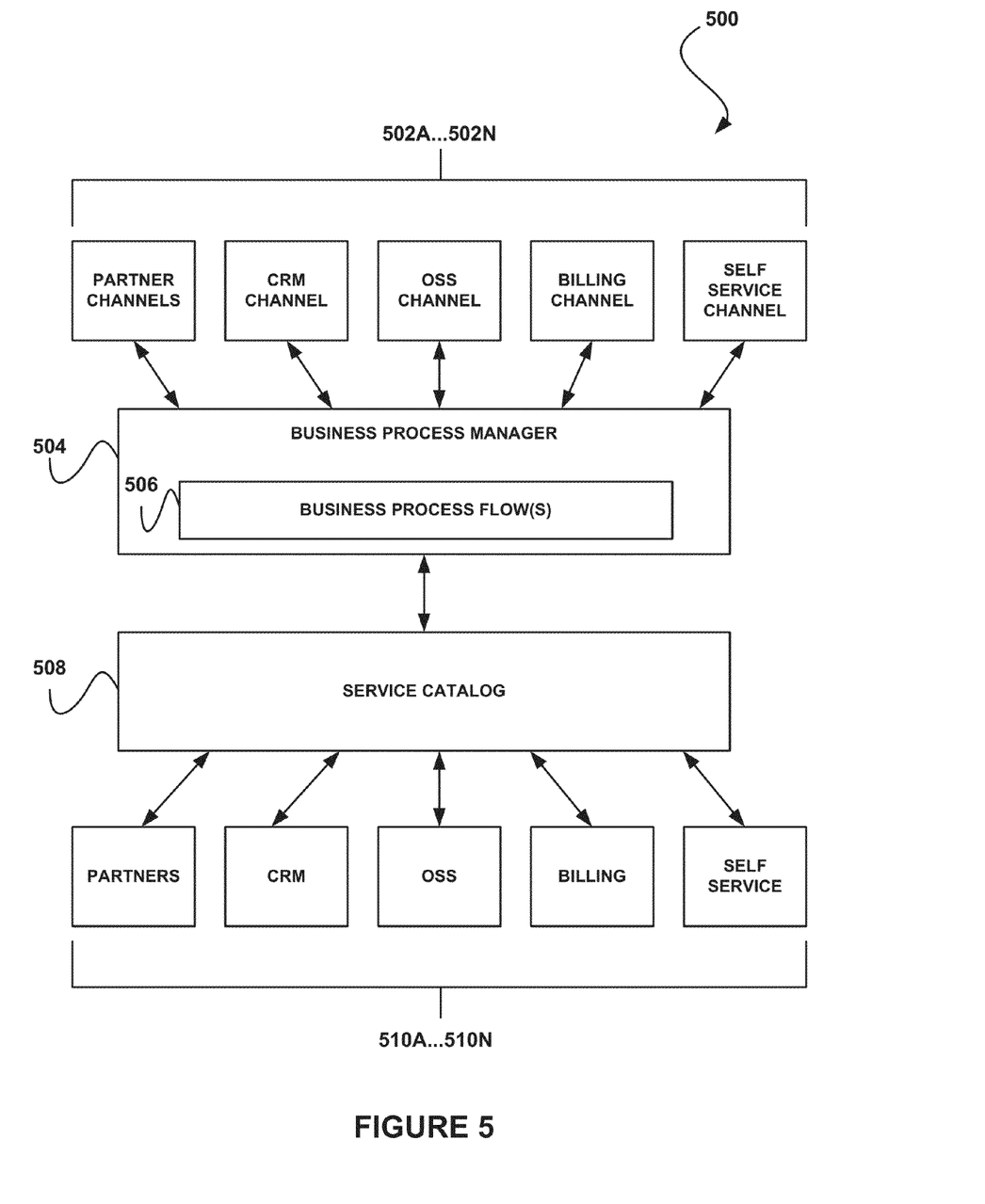
FIG. 5 illustrates a system for communication channel-independent business flow management, in accordance with yet another embodiment.

FIG. 5 illustrates a system 500 for communication channel-independent business flow management, in accordance with yet another embodiment. As an option, the system 500 may be implemented in the context of the details of FIGS. 1-4. Of course, however, the system 500 may be implemented in any desired environment. Further, the aforementioned definitions may equally apply to the description below.

As shown, each of a plurality of communication channels 502A-502N is in communication with a business process manager 504. The communication channels 502A-502N may include various transmission mediums via which a device (e.g. client device) may communicate. For example, as shown, the communication channels 502A-502N may include partner channels (i.e. communication channels provided by predetermined service providers), a customer relationship management (CRM) channel, an operational support system (OSS) channel, a billing channel, and a self service channel. In other examples (not shown), the communication channels 502A-502N may include a call center channel, a virtual agent channel, a retail store channel, etc.

The business process manager 504 via which communication over the communication channels 502A-502N is established/effected includes a platform independent of the communication channels 502A-502N. For example, the business process manager 504 may be provided by a third party system separate from the communication channel-specific backend systems 510A-510N of the providers of the communication channels 502A-502N. The business process manager 504 includes a repository of communication channel-independent business process flows 506 which maintains at least one communication channel-independent business process flow 506 for use in interfacing the communication channels 502A-502N with the respective communication channel-specific backend systems 510A-510N.

The business process manager 504 is capable of accessing services 508 of the communication channel-specific backend systems 510A-510N for use in communicating with the communication channel-specific backend systems 510A-510N. Thus, where each provider of a communication channel-specific backend system 510A-510N supports multiple different communication channels via multiple different services, the communication channel-independent business process flows 506 of the business process manager 504 may communicate with the appropriate communication channel-specific backend system 510A-510N via the associated service 508.

In one exemplary embodiment, a request for communication may be received by the business process manager 504 from a client device via one of the communication channels 502A-502N. For example, a user of the client device may request the communication via a user interface of an application installed on the device that is associated with the one of the communication channels 502A-502N (e.g. an email application, etc.). The communication channel 502A-502N may therefore send the communication request to the business process manager 504 which selects one of the communication channel-independent business process flows 506 from the repository of communication channel-independent business process flows 506.

The communication request may be received with a unique identifier of the communication. Such unique identifier may include tags of information. For example, the unique identifier may include an identifier of the communication channel 502A-502N via which the communication is requested and an identifier of a communication flow established for the communication (e.g. by the client device).

Upon selection of one of the communication channel-independent business process flows 506, the business process manager 504 initiates the selected one of the communication channel-independent business process flows 506. The business process manager 504 may further add an identifier of the selected communication channel-independent business flow 506 to the unique identifier of the communication. The communication request, along with the unique identifier (including the added identifier of the selected communication channel-independent business flow 506), are then provided by the communication channel-independent business process flow 506 to an associated communication channel-specific backend system 510A-510N via one of the services 508 providing the communication channel 502A-502N.

When the one of the services 508 receives the communication request and unique identifier, the service 508 may add to the unique identifier an identifier of the service 508. The unique identifier including the identifier of the communication channel 502A-502N, the identifier of the communication flow, the identifier of the communication channel-independent business process flow 506, and the identifier of the service 508 is then provided to the communication channel-specific backend system 510A-510N with the communication request. Upon receipt of the communication request, the communication channel-specific backend system 510A-510N may further add to the unique identifier an identifier of the communication channel-specific backend system 510A-510N (e.g. a server of the communication channel-specific backend system 510A-510N).

The communication channel-specific backend system 510A-510N receiving the communication request may then process the same for establishing or otherwise effecting the communication. The processing may include the communication channel-specific backend system 510A-510N identifying additional input required to establish/effect the communication. For example, the additional input required may be particular to the communication channel 502A-502N.

Thus, the communication channel-specific backend system 510A-510N may send a request for the additional input. The additional input request may be sent with the unique identifier to which the identifier of the communication channel-specific backend system 510A-510N has been added. Thus, any transfer of information associated with the communication may be accompanied by the unique identifier, and any new device, service, etc. receiving the unique identifier may add its own identifier to the unique identifier.

The communication channel-independent business process flow 506 may receive the additional input request and send the same to the communication channel 502A-502N for receipt by the client device. The client device may present the additional input request to the user for receiving the additional input from the user. Upon receipt of the additional input from the user, the additional input is provided by the communication channel 502A-502N to the communication channel-specific backend system 510A-510N via the communication channel-independent business process flow 506, in a manner at least similar to that described above with respect to the communication request.

To this end, the business process manager 504 may provide communication channel-independent business process flows 506 for interfacing the communication channels 502A-502N and communication channel-specific backend systems 510A-510N, in order to streamline management of interactions therebetween across various communication channels 502A-502N and in order to provide a seamless experience for the user. For example, a single communication channel-independent business process flow 506 (e.g. defined once) may be utilized to transfer a single communication flow between communication channels 502A-502N, such that the communication flow may start in one communication channel 502A-502N and subsequently proceed in another communication channel 502A-502N. The unique identifier may further be utilized for providing information and the stage of the transfer at any point when the communication flow is transferred between communication channels 502A-502N, such that requesting the same input from the user multiple times for the various communication channels 502A-502N may be avoided. In one embodiment, additional input associated with the communication may be received over another communication channel 502A-502N (e.g. from the client device) and such additional input may be provided to another communication channel-specific backend system 510A-510N via the communication channel-independent business process flow 506, using the unique identifier.

As described above, the communication channel-independent business process flow 506 may drive the communication flow on the front end (i.e. at the client device), while orchestrating calls of the communication channel-specific backend system 510A-510N. This centralized process management provided by the business process manager 504 may provide efficient communication channel 502A-502N handling in terms of consistent client device screen handling and communication with the communication channel-specific backend system 510A-510N. Establishing the communication channel-independent business process flow 506 repository for handling multiple communication channels 502A-502N may also reduce an amount of rework needed when the interaction cross system boundaries, as noted above.

Since the communication channel-independent business process flow 506 interfaces the communication channel 502A-502N with the communication channel-specific backend system 510A-510N, the communication channel-specific backend system 510A-510N may be re-used by multiple communication channels 502A-502N. The backend may therefore not necessarily know the communication channel 502A-502N from which the input/communication request is collected. Also, by allowing re-use of the channel-independent business process flow 506, re-use of data provided by the client device may be automatically provided.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program embodied on a non-transitory computer readable medium, comprising computer code for:

receiving by a system from a device a request to establish a communication with the device over a first communication channel including a particular type of transmission medium, the request including a unique identifier of the communication channel;

selecting by the system a communication channel-independent business flow of the system from a plurality of communication-independent data flows stored in a repository of the system in response to receiving the request, the communication channel-independent business flow including a process of the system that provides the received request to a backend system other than the receiving system that is specific to the communication channel;

adding by the system an identifier of the selected communication channel-independent business flow to the unique identifier of the communication channel;

providing by the communication channel-independent business flow of the system the request, the unique identifier of the communication channel, and the identifier of the selected communication channel-independent business flow to a backend system specific to the communication channel, using the communication channel-independent business flow;

transferring the communication flow from the first communication channel to a second communication channel; and utilizing the unique identifier to provide information and a stage of transfer when the communication flow is transferred from the first communication channel to the second communication channel.

2. The computer program of claim 1, wherein the input includes a request for the communication.

3. The computer program of claim 1, wherein the computer program is operable such that the input is received from a device of the user.

4. The computer program of claim 3, wherein the computer program is operable such that the input is received in response to the user entering the input via the device.

5. The computer program of claim 1, wherein the first communication channel includes a transmission medium for establishing the communication from a first party to a second party.

6. The computer program of claim 1, wherein the first communication channel includes one of an interactive voice response channel, an email channel, and a telephone channel.

7. The computer program of claim 1, wherein the computer program is operable such that the communication channel-independent business flow is re-usable across multiple different communication channels.

8. The computer program of claim 1, wherein the computer program is operable such that the communication channel-independent business flow is re-usable across multiple different channel-specific backend systems.

9. The computer program of claim 1, wherein the communication channel-independent business flow is a process independent of the first communication channel.

10. The computer program of claim 1, wherein the computer program is operable such that the unique identifier, including the identifier of the first communication channel, the identifier of the communication flow established for the communication, and the identifier of the initiated communication channel-independent business flow, is provided with the input to the communication channel-specific backend system.

11. The computer program of claim 10, further comprising:
computer code for receiving additional input associated with the communication over another communication channel; and
computer code for providing the additional input to another communication channel-specific backend system via the communication channel-independent business flow, using the unique identifier.

12. The computer program of claim 1, wherein the computer program is operable such that the input is provided to the communication channel-specific backend system for processing the input to provide the communication over the first communication channel.

13. The computer program of claim 2, wherein the communication channel-specific backend system adds an identifier of the communication channel-specific backend system to the unique identifier upon receipt of the request for the communication.

14. The computer program of claim 13, wherein the identifier of the communication channel-specific backend system includes an identifier of a server of the communication channel-specific backend system.

15. The computer program of claim 11, wherein the additional input is required to establish the communication, and the additional input is particular to the first communication channel.

16. The computer program of claim 1, wherein the communication channel-independent business flow is utilized for transferring the communication flow from the first communication channel to the second communication channel, such that the communication flow starts in the first communication channel and subsequently proceeds in the second communication channel.

17. A method, comprising:
receiving by a system from a device a request to establish a communication with the device over a first communication channel including a particular type of transmission medium, the request including a unique identifier of the communication channel;
selecting by the system a communication channel-independent business flow of the system from a plurality of communication-independent data flows stored in a repository of the system in response to receiving the request, the communication channel-independent business flow including a process of the system that provides the received request to a backend system other than the receiving system that is specific to the communication channel;
adding by the system an identifier of the selected communication channel-independent business flow to the unique identifier of the communication channel;
providing by the communication channel-independent business flow of the system the request, the unique identifier of the communication channel, and the identifier of the selected communication channel-independent business flow to a backend system specific to the communication channel, using the communication channel-independent business flow;
transferring the communication flow from the first communication channel to a second communication channel; and
utilizing the unique identifier to provide information and a stage of transfer when the communication flow is transferred from the first communication channel to the second communication channel.

18. A system, comprising:
a processor for:
receiving by a system from a device a request to establish a communication with the device over a first communication channel including a particular type of transmission medium, the request including a unique identifier of the communication channel;
selecting by the system a communication channel-independent business flow of the system from a plurality of communication-independent data flows stored in a repository of the system in response to receiving the request, the communication channel-independent business flow including a process of the system that provides the received request to a backend system other than the receiving system that is specific to the communication channel;
adding by the system an identifier of the selected communication channel-independent business flow to the unique identifier of the communication channel;
providing by the communication channel-independent business flow of the system the request, the unique identifier of the communication channel, and the identifier of the selected communication channel-independent business flow to a backend system specific to the communication channel, using the communication channel-independent business flow;
transferring the communication flow from the first communication channel to a second communication channel; and
utilizing the unique identifier to provide information and a stage of transfer when the communication flow is transferred from the first communication channel to the second communication channel.

19. The system of claim 18, wherein the processor is in communication with memory via a bus.

* * * * *